March 22, 1966  F. F. MONACO ETAL  3,241,706
FOOD-SERVING DEVICE

Filed Feb. 6, 1964  3 Sheets-Sheet 1

FOSTER F. MONACO
ROSARIO R. MONACO
INVENTOR.

BY

AGENT

March 22, 1966 F. F. MONACO ETAL 3,241,706
FOOD-SERVING DEVICE

Filed Feb. 6, 1964 3 Sheets-Sheet 2

INVENTOR.
FOSTER F. MONACO
ROSARIO R. MONACO
BY Karl G. Ross
AGENT

March 22, 1966 F. F. MONACO ETAL 3,241,706
FOOD-SERVING DEVICE

Filed Feb. 6, 1964 3 Sheets-Sheet 3

FOSTER F. MONACO
ROSARIO R. MONACO
INVENTOR.

BY

AGENT

United States Patent Office 3,241,706
Patented Mar. 22, 1966

3,241,706
FOOD-SERVING DEVICE
Foster F. Monaco, 246—06 Cullman Ave., Little Neck, N.Y., and Rosario R. Monaco, 3325 90th St., Jackson Heights, N.Y.
Filed Feb. 6, 1964, Ser. No. 342,880
1 Claim. (Cl. 220—17)

This application is a continuation-in-part of Ser. No. 153,963, filed Nov. 21, 1961, now Patent No. 3,130,288, granted Apr. 21, 1964.

This invention generally relates to covered food-service devices such as trays, pans and the like, and more particularly to a system for hinging the covers of such devices with the purpose of arresting them in various open positions.

Such food-service devices are widely used in private homes and also in certain stores and restaurants where foods, e.g. baked goods or meats, are kept on counters directly in front of customers for viewing purposes. Until now, a person wishing to dispense such foods was forced to remove the cover from the receptacle and put it aside while extracting the food, thus exposing the contents freely to possible contamination and negating for that period the effectiveness and purpose of the cover. Alternately, if the cover was hinged, it was necessary heretofore to hold it by hand in the desired position. Again, in the case of hot or iced foods the complete removal of the cover resulted in a rapid cooling or warming process, whereas the holding-open of a hinged cover obviously constituted an impediment to the removal of the food.

Accordingly, it is an object of our invention to provide a device with a removable cover hinged in such a way that it can be selectively arrested in a plurality of positions, making the contents of the device readily and conveniently accessible while still protecting them from ambient influences.

Another object of our invention is to provide a food-service device having means for maintaining food at selected temperatures prior to serving and protecting this food from ambient conditions at all times.

It is also an object of our invention to provide in such device means enabling free circulation of air and/or vapors therein for equalizing the temperature in the receptacle and, if desired, venting its interior toward the atmosphere.

A further object of our invention is to provide a food-service device which at all times enables visual inspection of its contents without requiring their exposure to the atmosphere and which, on removal of part of such contents, protects the remainder against ambient influences.

In accordance with our present invention we provide a food-service device forming at least one upwardly open receptacle with double bottom and a removable, hinged cover, the double bottom encompassing a space for the acommodation of a temperature-controlling fluid, such as a bath of hot or cold water, and being impervious thereto. The receptacle may have the shape of a pan with an interior peripheral ledge having at least one tray, dish or similar vessel suspended therefrom, the lower surface of this container being elevated above the bottom of the pan to define the aforementioned fluid space therewith and to permit the food temperature to be maintained by filling that space with a suitable liquid to a level above the lower surface of the inner vessel. A receptacle of this general type has been disclosed in our aforementioned copending application Ser. No. 153,963.

According to a more particular feature of this invention, the cover of the device is provided with an outwardly extending peripheral lip overlying, in closed position, a peripheral flange defining a confronting ledge on the receptacle from which the aforementioned inner vessel or vessels are suspended. These vessels, as shown in our aforementioned application, preferably are slightly spaced apart to facilitate the circulation of vapors therebetween and to create a venting effect. The cover, advantageously, is swingably connected to the receptacle on at least two points by hinges mounted on the aforesaid lip and flange, respectively, and so constructed as to permit the cover to be arrested or indexed in a plurality of positions. The cover is preferably of convex shape, e.g. with a generally semi-ellipsoidal bluge, not only for an increased container volume but also for greater stability in a partly open position.

Both the cover and the receptacle are advantageously made of a transparent, preferably plastic material to permit unhindered viewing of the contents at all times and in any position of the cover while giving maximum protection against breakage.

The invention will be described in greater detail with reference to the accompanying drawing wherein.

Figure 3:
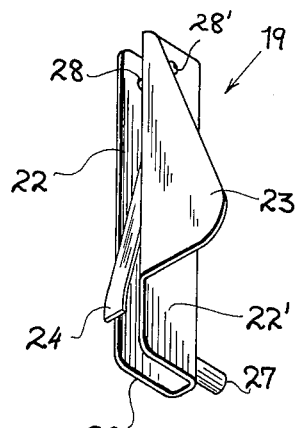
FIG. 3 shows, in a perspective view drawn to a larger scale, an embodiment of a hinge used for removably joining the cover to the receptacle and for arresting the cover in several raised positions.
Figure 5:
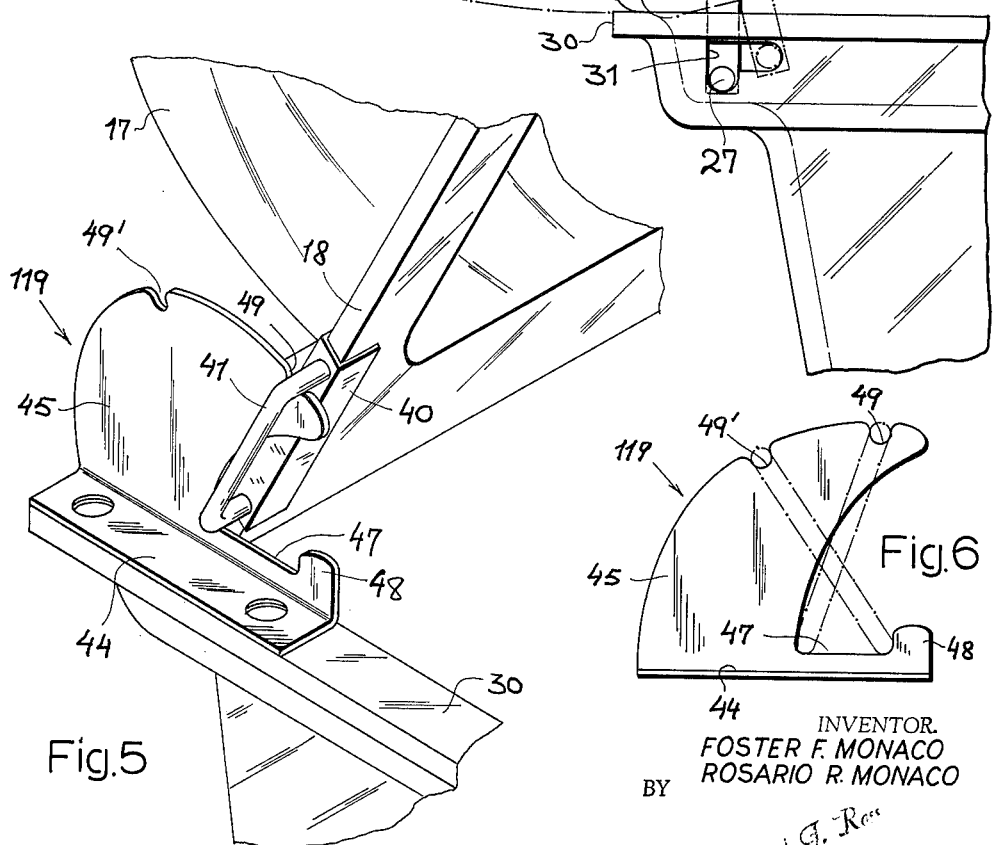
Figure 6:
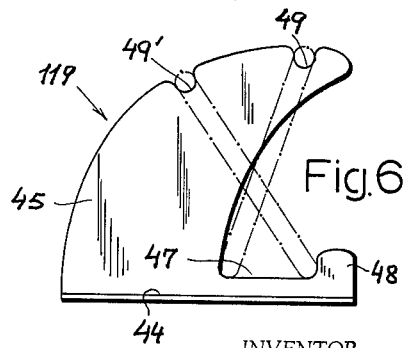
Figure 8:
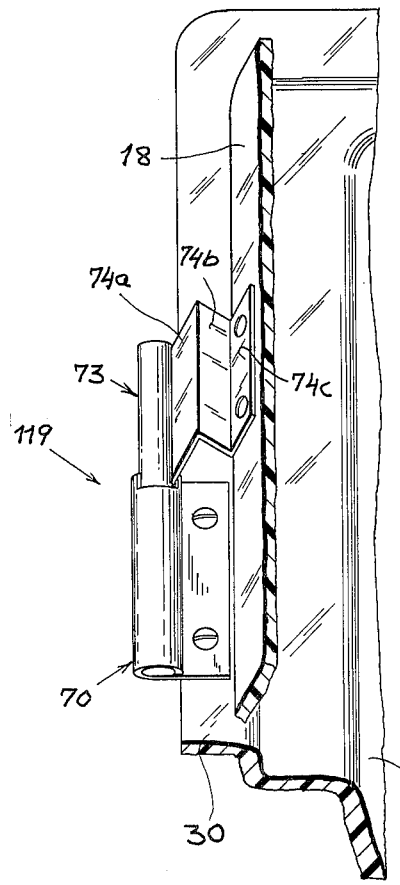
Figure 9:
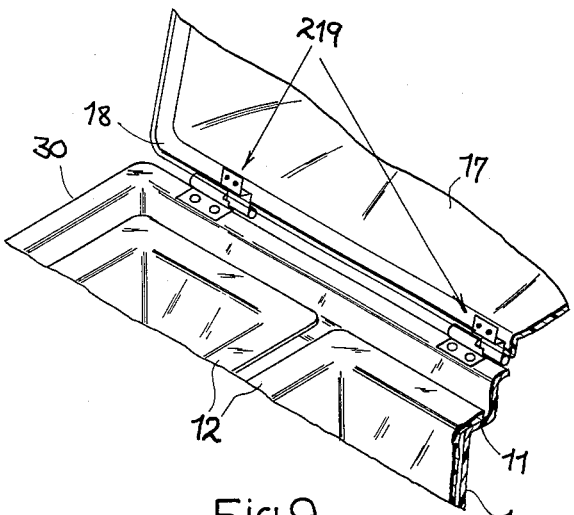
Figure 7:
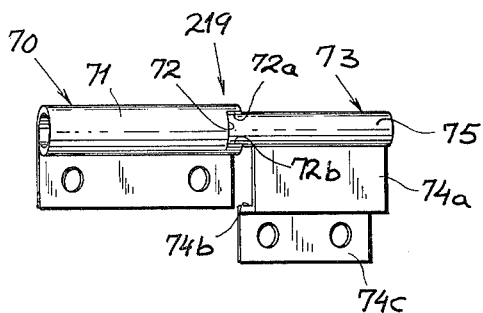

FIG. 5, in a view similar to FIG. 3, shows a modified hinge;

FIG. 6 shows the hinge of FIG. 5 in an elevational view;

FIG. 7 is a top view of still another modified hinge;

FIG. 8 is a partial section through a receptacle whose cover is held in place and arrested in an open position by hinges of the type shown in FIG. 7; and FIG. 9 is a partial view of the rear wall of the receptacle shown in FIG. 8.

Figure 1:
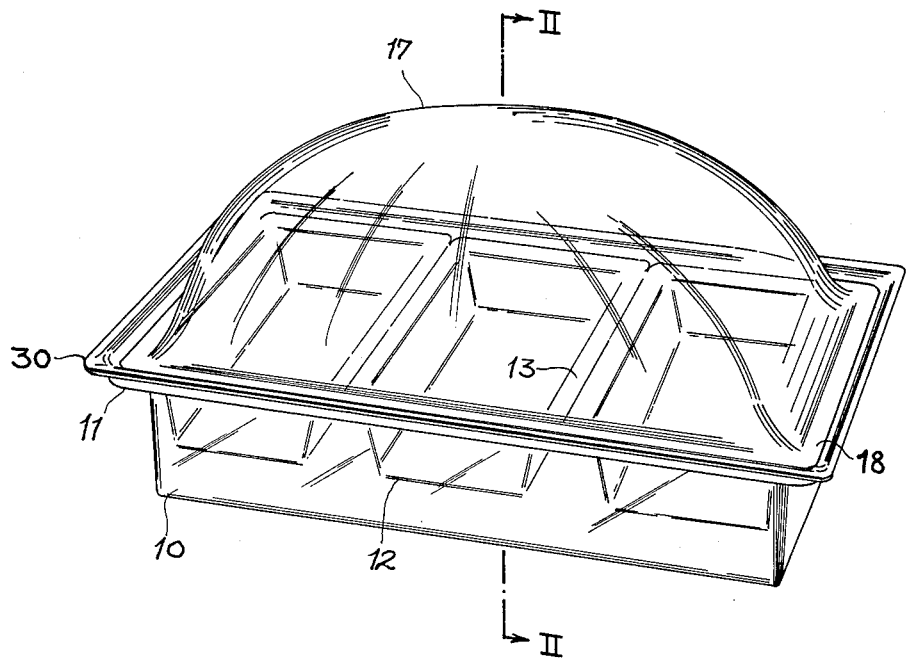
FIG. 1 shows a perspective view of a food receptacle and cover therefor embodying our invention.
Figure 2:
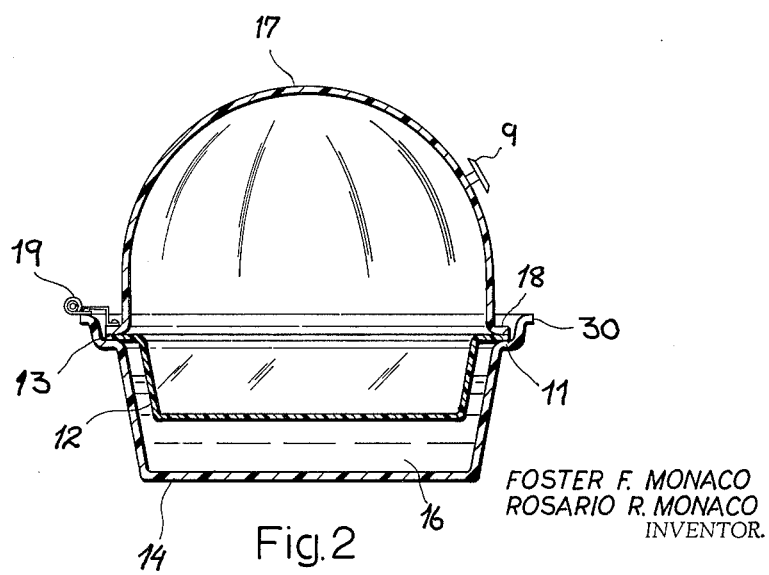
FIG. 2 is an elevational cross-section taken on the line II—II of FIG. 1.

In FIGS. 1 and 2 we have shown a food-service device embodying our invention. This device includes a receptacle 10 provided with a removable cover 17. Suspended from opposite ends of an inner peripheral ledge 11 of the receptacle, by means of peripheral flanges 13, are several juxtaposed trays 12 which are not as deep as the receptacle 10 and which are slightly separated as shown in FIG. 9. The space formed by the bottom 14 of receptacle 10 and the bottoms 15 of the suspended trays 12 serves for the storage of a temperature-controlling fluid such as a water bath 16. Domed cover 17 overlies the receptacle ledge 11 with its peripheral lip 18 and is removably connected to the receptacle by a pair of two-step hinges 19 (only one shown) which are symmetrically disposed and are preferably made of chrome or stainless steel, their construction being more fully described hereinafter. Ledge 11 is formed by a stepped flange 30 which frames the open top of receptacle 10. In operation, receptacle 10 is filled with hot water or ice to the desired level below the top of the removable trays 12. The trays 12 are then immersed with the food contained therein and suspended from ledge 11. For removal of food from any tray 12, or for the replenishment of its contents, the cover 17 is lifted by means of a knob 9 and arrested in the desired partly or fully open position thereof for as long a time as is necessary. The bath 16 may be provided with suitable means (such as an immersion heater, not shown) for controlling its temperature, as illustrated in our copending application.

Figure 4:
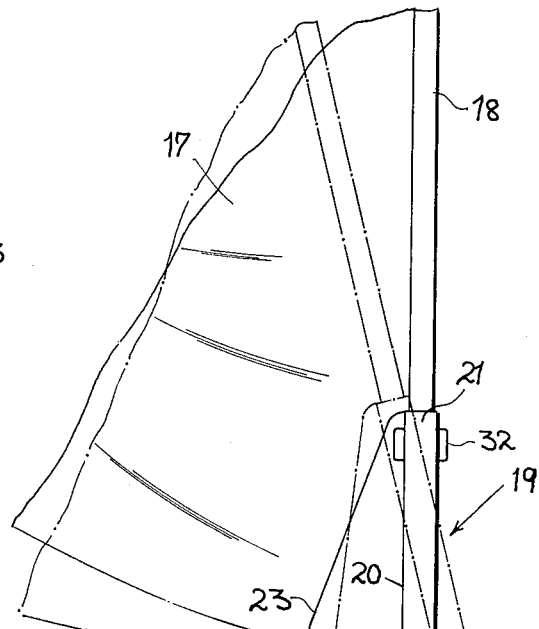
FIG. 4 is a partial sectional view of the hinge shown in FIG. 3, seen in place on the receptacle, for arresting the cover in an open position, an alternate position being indicated in dot-dash lines.

FIGS. 3 and 4 show details of the hinge 19 which permits the cover 17 to be raised and arrested in two different open positions. The hinge 19 comprises a channeled bracket 20 having two wings 22, 22'; a nose-shaped lug 23, integral with wing 22' of bracket 20, projects from the edge of that wing at right angles thereto. A leaf spring 24 is fastened at one extremity to the inside of the channel web 21 near the upper end of the bracket 20 (reference being made to the upturned hinge position shown in FIGS. 3 and 4); the other extremity of the spring bears upon the edge 18 of cover 17 when the lower end of the latter, i.e. the one in raised position of the cover remains closest to the receptacle, is inserted into the bracket as illustrated in FIG. 4. A pin 27 extends horizontally outwardly from the exterior surface of the channel web 21 at the lower end of the bracket 20. Holes 28, 28' are provided in the upper ends of the wings 22, 22' for mounting purposes, the hinge 19 being secured to the cover 17 by screws or rivets 32 engaging the edge 18 through these holes.

To connect the cover with the receptacle body 10, the lower end of bracket 20 of each of the two hinges is pressed firmly onto the engaged edge 18, thereby depressing the leaf spring 24 and causing the respective pins 27 to be displaced inwardly toward each other. The pins 27 are then brought into alignment with respective L-shaped slots 31 (one shown in FIG. 4) in flange 30, the short arm of the "L" extending vertically and the long arm extending horizontally within that flange and toward the front of the receptacle 10, whereupon pressure on the hinges is released, thus permitting the springs 24 to swing the lower ends of the brackets 20 outwardly about their fasteners 32 as each pin enters its slot 31. To remove the cover the procedure is reversed.

When, from its closed position, the cover 17 is swung counterclockwise (as viewed in FIG. 4) about the pins 27 lodged in the short vertical arms of slots 31, the lugs of the hinges 19 will come to bear with their horizontal edges on flange 30 and hold the domed cover, whose center of gravity is located just to the rear of the pivotal axis defined by the pins 27, in an approximately vertical position in FIG. 4. Lifting the cover 17 up and sliding the pins 27 to the front end of the long arms of slots 31, on the other hand, brings the sloping edges of the lugs into contact with the flange 30 so that the cover assumes a more widely open, rearwardly inclined position as illustrated in dot-dash lines in FIG. 4.

A further embodiment is shown in FIGS. 5 and 6. Cover 17 is here removably held in place by modified hinges 119 (only one shown). One part of each hinge, mounted on the edge 18 of cover 17 near the pivotal axis thereof, comprises a rectangular mounting plate 40 and a stirrup 41 joined at its ends to respective extremities of this plate, thus forming with it an elongated loop. Another hinge part consists of a rectangular mounting plate 44 and a stepped lug 45, integral with plate 44, rising perpendicularly from one of its edges. The upper periphery of lug 45 curves upwardly in a forward direction and bears several downwardly concave notches 49, 49'. Along the joint formed with the plate 44 the lug 45 is partly recessed in an elongated downwardly concave notch 47 leaving an upright front stop 48. This male part 44, 45 of the hinge 119 is fastened to a corner of the receptacle flange 30 confronting the female part 40, 41 mounted on the cover.

In use, the lug 45 is inserted into the loop 40, 41, the cover 17 is tilted backwards to a sufficient extent to permit the top of the loop to clear the upper edge of lug 45, the lower edge of the cover 17 is moved to the rear until the lower extremity of the stirrup 41 lodges against the back end of notch 47, and the cover is given a slight forward inclination and released, the upper extremity of stirrup 41 being thus received in notch 49. In this position the center of gravity of the domed cover 17 is located forwardly of the pivotal axis defined by the lower extremities of stirrups 41. To permit easier access to the trays 12, the cover 17 may also be indexed in a more widely open position by tilting it backwards until the lower end of stirrup 41 engages the front stop 48 of notch 47 while the upper extremity of the stirrup lodges in notch 49' of lug 45.

The device shown in FIGS. 7, 8 and 9 constitutes still another form of hinge adapted to interconnect a receptacle 10 and a domed cover 17 similar to those of FIGS. 1 and 2. This hinge 219, joining cover and receptacle in removable relationship, consists of two parts mounted, respectively, on the flange 30 of the receptacle and the edge 18 of the cover. The female part of the hinge comprises a rectangular mounting plate 70 having an integral sleeve formation 71 longitudinally disposed along the periphery of one side, one edge of this sleeve being recessed in the form of a notch 72 extending over part of the circumference of sleeve 71 and terminating in stops 72a and 72b. The male part of hinge 219 comprises a flat member 73 bent in two places at relatively inverted angles to form two substantially horizontal plate sections 74a and 74c and a sloping plate section 74b interposed between them, all of these sections being integral and of rectangular configuration, and a pin 75 disposed along the exposed elongated edge of one of the outer plate 74a, pin 75 having an outer diameter smaller than the inner diameter of sleeve 71 and being pivotally receivable within that sleeve. In operation, with a pair of these hinges mounted asymmetrically in axial alignment as illustrated in FIG. 9, pin 75 is inserted into the sleeve 71, thus joining cover and receptacle to each other. To arrest the cover 17 in an open position, the cover is raised, moved sideways until the plate section 74a of member 73 engages in the notch 72 of sleeve 71, and released. Depending upon whether the cover has been released at a backward or forward slant, the edge of section 74a will come to rest against stop 72a or 72b, thus causing the cover to remain more or less widely open. It will be understood that stability of the cover in either of its open positions is insured by the location of its center of gravity either forwardly or rearwardly of its horizontal hinge axis.

As illustrated in FIG. 9, the flanged trays 12 are suspended from the front and rear ledge portions 11 of the outer vessel 10 with slight mutual spacing to facilitate the circulation of air and/or vapors from the bath 16 (FIG. 2). As will be further apparent from FIG. 2, the cover 17 fits with slight clearance within the flange 30 whereby the air and/or vapors may readily pass out into the atmosphere even when the cover is closed, this venting action taking place through a set of sufficiently restricted passages so that no material heat exchange occurs between the bath and the atmosphere except for the unavoidable thermal conduction through the walls of the vessel 10 and the cover 17 made of suitable plastic or other material of low heat conductivity. It may be noted that the necessary clearance between the cover and the flange 30 of vessel 10 may be insured by other means, such as a set of grommets or similar projections on the underside of flange 18 as disclosed in our aforementioned application Ser. No. 153,963. Furthermore, the lateral separation between the trays 12 allows the circulation of vapors and/or convection currents between the bottom of the receptacle, i.e. the region of bath 16, and its top, i.e. the space within the domed cover 17, to insure uniformity of temperature to the greatest extent possible.

The invention herein described admits of a variety of modifications readily apparent to those skilled in the art and considered to be within the scope of this disclosure as defined in the appended claim.

We claim:

A display-type food-service receptacle comprising an upwardly open outer vessel and a complementary domed cover each made of a transparent plastic material which maintains a selected temperature within said receptacle; said vessel being of rectangular outline and integrally formed with an outwardly projecting peripheral flange which rises above two longitudinal and two transverse ledges extending integrally inwardly from said flange and defining a continuous frame around the open top of the vessel, said cover fitting inside said flange above said ledges; and a plurality of upwardly open juxtaposed flanged plastic trays of rectangular configuration slidably suspended by their respective flanges from said longitudinal ledges in spaced relationship with the walls and bottom of said vessel, the combined width of said trays measured parallel to said longitudinal ledges being less than the spacing of said transverse ledges, thereby always providing a venting passage enabling the circulation of fluid from the space underneath said trays to the region above said trays, said space underneath being adapted to receive a temperature-controlling fluid, said cover resting on the flanges of said trays in a closure position.

References Cited by the Examiner

UNITED STATES PATENTS

| | | | |
|---|---|---|---|
| 120,995 | 11/1871 | O'Sullivan | 220—13 |
| 314,244 | 3/1885 | Henkel | 220—96 X |
| 1,003,112 | 9/1911 | Johnson | 220—13 |
| 1,199,680 | 9/1916 | Fabian | 220—96 |
| 1,647,602 | 11/1927 | Bogle | 220—31 |
| 2,215,113 | 9/1940 | Vogel | 220—43.4 |
| 2,504,132 | 4/1950 | Jones | 220—16 X |
| 2,814,381 | 11/1957 | Stevick | 206—45.34 |
| 2,908,468 | 10/1959 | Thomas | 220—96 X |
| 2,944,694 | 7/1960 | Kinsey | 220—17 |
| 3,025,947 | 3/1962 | Hammer | 220—16 X |

LOUIS G. MANCENE, *Primary Examiner.*

THERON E. CONDON, *Examiner.*

R. A. JENSEN, *Assistant Examiner.*